(12) United States Patent
Masters

(10) Patent No.: US 8,521,846 B2
(45) Date of Patent: Aug. 27, 2013

(54) MECHANISM FOR CUSTOMIZED AGGREGATION OF SYSTEM-SPECIFIC INFORMATION FOR POST-INSTALLATION SUGGESTIONS

(75) Inventor: Jon Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 12/852,912

(22) Filed: Aug. 9, 2010

(65) Prior Publication Data

US 2012/0036504 A1 Feb. 9, 2012

(51) Int. Cl.
*G06F 13/00* (2006.01)
(52) U.S. Cl.
USPC .............................. 709/219; 709/229; 709/250
(58) Field of Classification Search
USPC .......................... 709/217, 219, 227, 229, 250
See application file for complete search history.

(56) References Cited

U.S. PATENT DOCUMENTS

| 7,644,404 B2 * | 1/2010 | Rao et al. ..................... 717/169 |
| 7,913,246 B2 * | 3/2011 | Hammond et al. .......... 717/173 |
| 8,019,725 B1 * | 9/2011 | Mulligan et al. ............. 707/638 |
| 2006/0184927 A1 * | 8/2006 | Deblaquiere et al. ......... 717/168 |
| 2007/0094658 A1 * | 4/2007 | DiCarlo et al. .............. 717/178 |
| 2008/0244555 A1 * | 10/2008 | Welvaert et al. ............. 717/169 |
| 2009/0319848 A1 * | 12/2009 | Thaper ......................... 714/748 |

* cited by examiner

*Primary Examiner* — Viet Vu
(74) *Attorney, Agent, or Firm* — Lowenstein Sandler LLP

(57) ABSTRACT

A mechanism for customized aggregation of system-specific information for Post-Installation Suggestions is disclosed. A method of embodiments includes determining identifying information of a computer system of an end user computing device communicably coupled to an update service computing device, aggregating a plurality of updates, suggestions, and information specific to the computer system of the end user computing device into a customized result list, the plurality of updates, suggestions, and information received from a repository of historical system results and a plurality of third-party vendors and associated with various components of the computer system including the hardware of the computer system and the software of the computer system, and providing the customized result list to the end user computing device.

20 Claims, 5 Drawing Sheets

| |
|---|
| System Identifying Information 405 |
| *Hardware Updates* 410<br> •<br> • Descriptions & Hyperlinks<br> • |
| *Software Updates* 420<br> •<br> • Descriptions & Hyperlinks<br> • |
| *Drivers* 430<br> •<br> • Descriptions & Hyperlinks<br> • |
| *Known Errata* 440<br> •<br> • Descriptions & Hyperlinks<br> • |
| *Recall Information* 450<br> •<br> • Descriptions & Hyperlinks<br> • |
| *Partner-Provided Suggestions:*<br>*Updates & Applications* 460<br> • Descriptions & Hyperlinks<br> • |
| *Knowledge Base Articles* 470<br> •<br> • Descriptions & Hyperlinks<br> • |

Customized Update Result Display Page 400

MECHANISM FOR CUSTOMIZED AGGREGATION OF SYSTEM-SPECIFIC INFORMATION FOR POST-INSTALLATION SUGGESTIONS

TECHNICAL FIELD

The embodiments of the invention relate generally to computer system updates and, more specifically, relate to customized aggregation of system-specific information for Post-Installation Suggestions.

BACKGROUND

Typically, when an end user installs an operating system on their computer, there are a variety of updates that still need to be installed on the system. Current update utilities exist that direct the end user to updates for the software itself, or updates for particular drivers on the computer. However, these utilities are typically tailored to only one aspect of the computer system. For instance, providing software updates for a particular piece of software, or driver updates for a particular piece of hardware.

Furthermore, end users of computer systems may wish to be presented with more than just updates. For example, an end user may wish to see information related to known errata associated with their present system, recall information associated with their present system, knowledge base articles related to their particular system, and suggested products or application that are popular with other users of the same system. The presently-provided update utilities do not provide a comprehensive list of suggestions tailored to the specific system of the computer itself, as well as list of the other non-update related material described above.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 4 is a block diagram of a customized update result display page according to one embodiment of the invention;

DETAILED DESCRIPTION

Figure 1:
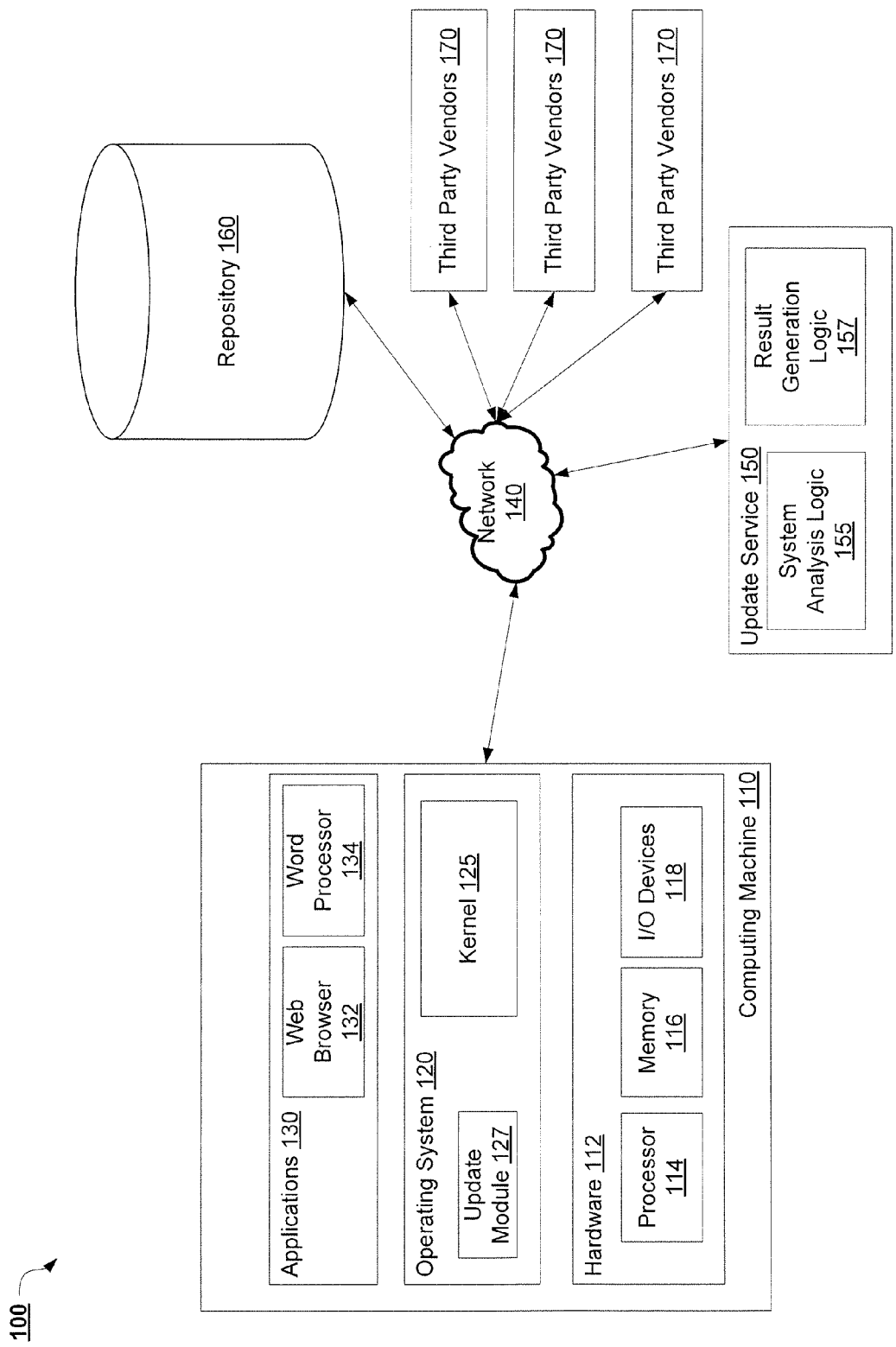
FIG. 1 is a block diagram of a system employing customized aggregation of system-specific information for Post-Installation Suggestions according to an embodiment of the invention.

Embodiments of the invention provide a mechanism for customized aggregation of system-specific information for Post-Installation Suggestions. A method of embodiments of the invention includes determining identifying information of a computer system of an end user computing device communicably coupled to an update service computing device, aggregating a plurality of updates, suggestions, and information specific to the computer system of the end user computing device into a customized result list, the plurality of updates, suggestions, and information received from a repository of historical system results and a plurality of third-party vendors and associated with various components of the computer system including the hardware of the computer system and the software of the computer system, and providing the customized result list to the end user computing device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "aggregating", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, flash memory, optical storage media, flash memory devices, etc.), a machine (e.g., computer) readable transmission medium (non-propagating electrical, optical, or acoustical signals), etc.

Embodiments of the invention provide a mechanism for customized aggregation of system-specific information for Post-Installation Suggestions. Embodiments of the invention provide a list of hardware updates, software updates, driver updates, errata, and customized suggestions for the specific computer system, including installed hardware and software of that system. An update utility of the OS gathers the computer system-specific information, such as model number, OS version, hardware types and versions, installed software and versions, and so on, and then intelligently aggregates the customized updates and other information for that specific computer system in one location without prompting from an end user of that computer system.

FIG. 1 is a block diagram of a system 100 employing customized aggregation of system-specific information for Post-Installation Suggestions according to an embodiment of the invention. System 100 includes a computing machine 110, update service 150, repository 160, and third party vendors 170, all communicably connected via network 140. In some embodiments, network 140 may be a local area network (LAN), a wide area network (WAN), an intranet, an extranet, the Internet, or a cloud, to name a few examples.

In one embodiment, computing machine 110 includes hardware 112, an operating system (OS) 120, and applications 130. Hardware 112 may include, but is not limited to, components such as processor 114, memory 116, and input/output (I/O) devices 118. OS 120 includes a kernel 125, as well as an update module 127 that assists in the performance of embodiments of the invention. Applications 130 may include, but are not limited to, a web browser 132 and a word processor 134, for example.

In one embodiment, upon installation of the OS 120, an update module 127 of OS operates to identify the computer system to update service 150. In some cases, this means providing a computer system make and model to update service 150. In one embodiment, the system make and model may include the manufacturer of the system, such as Dell™, Hewlett Packard™, or Sony™, for example, and a model number of the particular computer system that the manufacturer assigns. The update module 127 may be able to access a system file that includes the actual system make and model information. In other cases, if the exact system make and model cannot be sent, then other system information is sent to update service 150 for use in identifying the system. For example, a script or application may be executed by the update module 127 to collect a list of all hardware devices that can be obtained from the kernel 125 and also get a list of hardware device IDs. The update module 127 may also access a system package database, which is a built-in database that knows the software installed on the system, to obtain the identifying information. The update module 127 then submits this information to an online service, e.g., update service 150. In some embodiments, the update module 127 may use an XML RPC protocol to send the information. In other embodiments, the update module 127 may use a REST protocol to send the information.

Once the system information from computing machine 110 is received, update service 150 identifies any updates, suggestions, and other helpful particulars for the specifically-identified computing machine 110. These updates, suggestions, and other particulars may include not only driver and software updates, but also partnered software updates, new features, BIOS updates, known errata, safety or recall issues, and a list of knowledge-based items pertaining to the specific identified system of the computing machine 110. For ease of description, the about updates, suggestions, and other particulars will be identified as "customized aggregated system update information" throughout the remaining description.

The customized aggregated system update information is collected and put together by update service 150 once it receives the system identifying information from the computing device 110. In some embodiments, a specific system model is not identified, but rather only identification information of various pieces of hardware, the OS, and installed applications of the computing device 110 is provided. In this case, system analysis logic 155 of update service 150 may reference a database of such hardware, OS, and application combinations to determine the most likely system that the provided identifying information defines.

In some embodiments, the database may be a community or vendor-maintained database. In some cases, both community and vendor-maintained databases could exist with the latter containing only verified entries for officially supported platforms (embodiments of a computing system). The database simply stores collections of known devices—including their hardware identification information (serial numbers, model numbers, unique device IDs for specific classes of devices, etc.) for each type of system. For example, model X of a computer system by manufacturer Y may use devices from vendors A, B, and C, with hardware identifiers 1, 2, and 3. The combination of devices used and the presence of the specific devices can be used to identify the system without having the precise manufacturer information available. This can also be used to classify systems for which no information is available. For example, even if the model X is not known, a generic name can be assigned to refer to systems that match the description in order to make useful suggestions. Typically, results would be reviewed from time to time by authorized persons in order to correlate results with systems by hand, or data may be added that is supplied by third parties in order to match systems with those vendors. This can be applied retroactively to existing stored search data entries.

Update service 150 takes the identified system and references one or more different sources in order to collect the customized aggregated system update information tailored to the identified system of computing machine 110. For instance, update service 150 may reference a repository 160 that includes a history of results previously returned for the identified system. In addition, updates service 150 may also reference one or more third party vendors 170 to obtain their specific updates for hardware or software, as well as marketing materials for the system, known errata for the system, and knowledge base articles for the system. In some embodiments, one or more third party vendors 170 may partner with update service 150 to provide manual suggestions and updates for particular systems that utilize the update service 150.

Once the customized aggregated system update information is collected by update service 150, results generation logic 157 generates and sends back a result list with this information to the computing machine 110 for display to an end user of the machine 110. In one embodiment, this result list is in the form of a web page displayable by web browser 132. As such, the end user of computing device 110 is provided with a complete and exhaustive resource for updating and improving the specific system of computing machine 110. The end user does not have to reference multiple different vendor websites to obtain the resources it needs to updates various hardware and software of the system, as well as identify known issues, problems, and fixes for that particular system.

Figure 2:
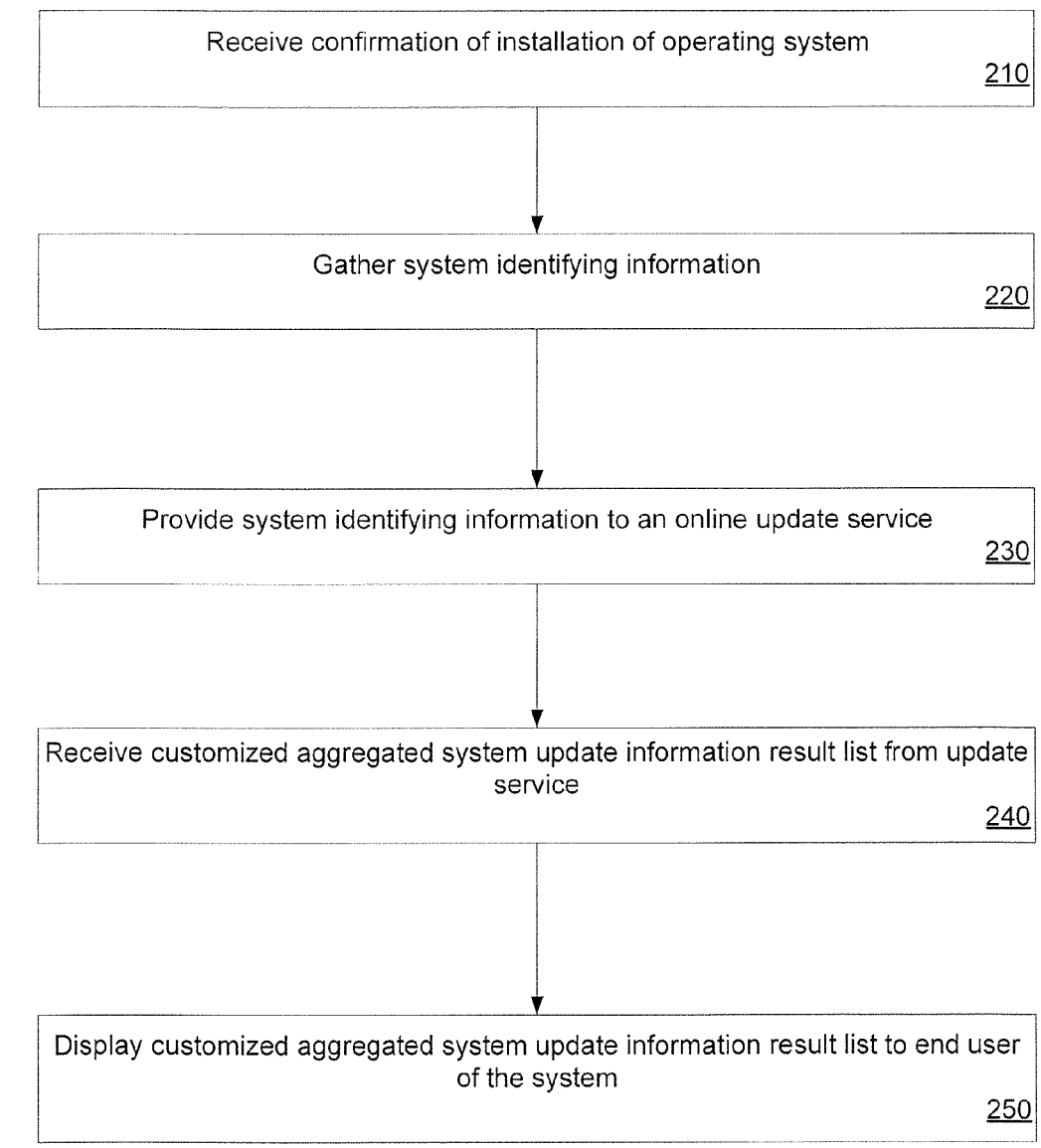
FIG. 2 is a flow diagram illustrating a method performed by an update module of a computing machine for customized aggregation of system-specific information for Post-Installation Suggestions according to an embodiment of the invention.

FIG. 2 is a flow diagram illustrating a method 200 performed by an update module of a computing machine for customized aggregation of system-specific information for Post-Installation Suggestions according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by update module 127 of FIG. 1.

Method 200 begins at block 210 where confirmation is received that an OS has been installed on a computing device. In one embodiment, the OS is installed by an installer that notifies an update utility of the OS installation. Then, at block 220, system identifying information of the computing device is gathered. The system identifying information, including make and model information, may be accessed from a system file that includes the actual system make and model information. In other cases, if the exact system make and model cannot be gathered, then other system information may be collected for use in identifying the system. For example, a script or application may be executed to collect a list of all hardware devices that can be obtained from the kernel and also to get a list of hardware device IDs. In addition, a system package database, which is a built-in database that knows the software installed on the system, may be accessed to obtain the identifying information of installed software.

At block 230, the gathered computer system identifying information is sent to an online update service. The online update service operates to collect updates, suggestions, and other system-specific particulars such as partnered software updates, new features, BIOS updates, known errata, safety or recall issues, and knowledge-based items pertaining to the specific identified system. At block 240, this customized aggregated system update information is received in a result list from the online update service. In some embodiments, this result list has a web page format. At block 250, the customized aggregated system update information result list is displayed to an end user of the computer system. In one embodiment, the result list may be displayed by a web browser to an end user.

Figure 3:
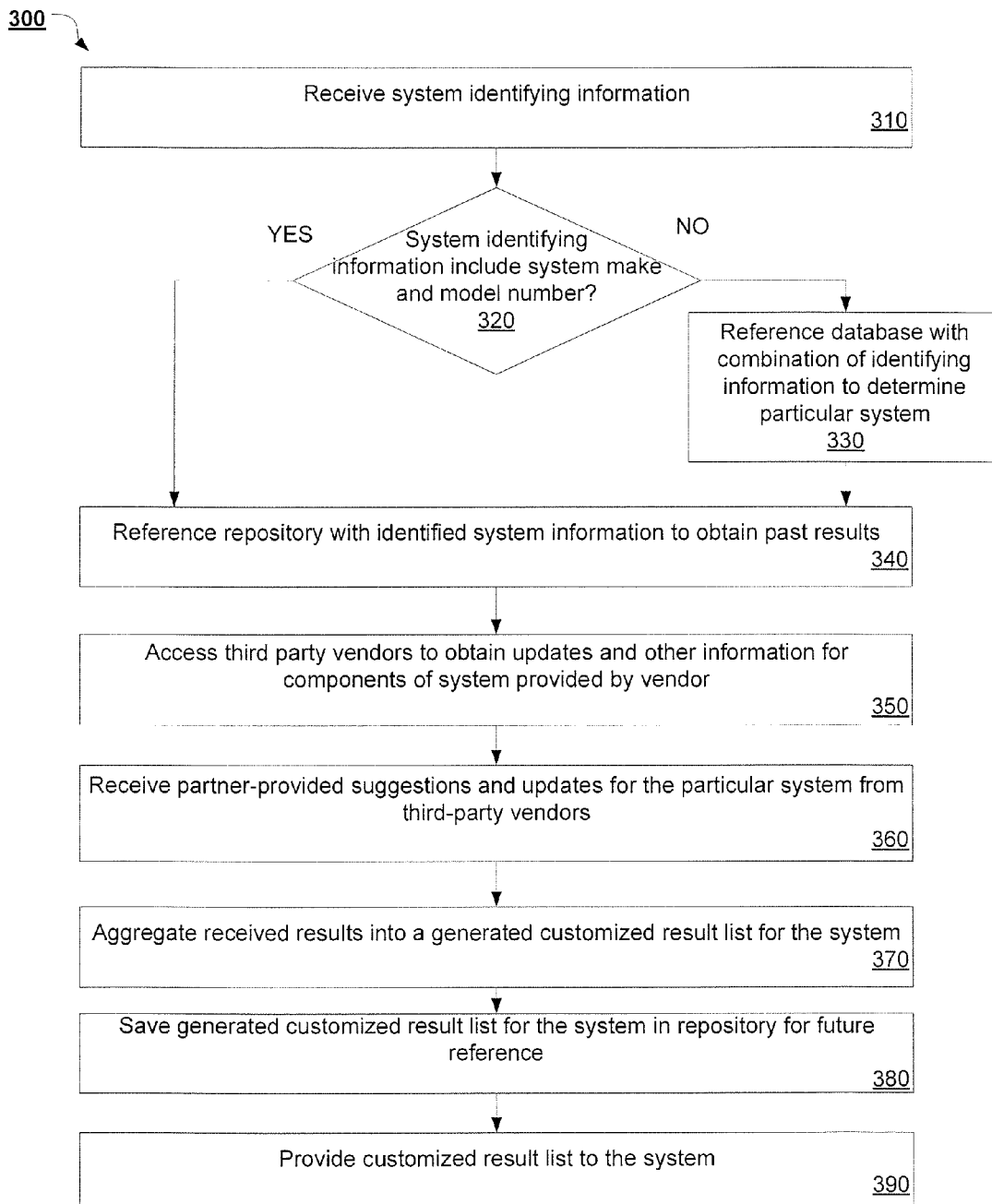
FIG. 3 is a flow diagram illustrating a method performed by an update service for customized aggregation of system-specific information for Post-Installation Suggestions according to an embodiment of the invention.

FIG. 3 is a flow diagram illustrating a method 300 performed by an update service for customized aggregation of system-specific information for Post-Installation Suggestions according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by update service 150 of FIG. 1.

Method 300 begins at block 310 where computer system identifying information is received at an update service from a computing device. In some embodiments, the computer system identifying information includes a computer system make and model number of the computing device. In other embodiments, the computer system identifying information includes, but is not necessarily limited to, a list of hardware, a list of installed software, and an OS version of the computing device.

At decision block 320, it is determined whether the computer system identifying information includes a computer system make and model number. If so, method 300 proceeds to block 340. If not, method 300 proceeds to block 330, where a database is referenced with the identifying information that was received in order to determine a particular system that encompasses the combination of the identifying information received from the computing device.

At block 340, a repository is referenced with the identified system in order to obtain past historical result lists used for the particular system. In addition, at block 350, third party vendors are accessed in order to obtain updates and other system information for the various components of the identified system. The updates may include hardware updates, software updates, driver updates, and so on. The other system information may include known errata and recalls, associated fixes for these issues, knowledge-based articles, and other relevant information for the specific identified system of the computing device. At block 360, partner-provided suggestions and updates for the particular identified system are also received.

Then, at block 370, all of the received information from blocks 340 through 360 is aggregated in to a customized result list of updates, suggestions, and information for the specific identified system. In some embodiments, the customized result list may be in a hypertext format for viewing with a web browser. However, embodiments of the invention are envisioned to utilize any various number of formats for presenting the customized result list. At block 380, the generated customized result list is saved in the repository for future reference. Lastly, at block 390, the generated customized result list is sent back to the computing device.

FIG. 4 is a block diagram of a customized update result display page 400 according to one embodiment of the invention. The customized update result display page 400 is one example of a result list of customized system updates, suggestions, and information generated and sent to a computing device. For example, update results display page 400 may be generated by update service 150 specifically for computing device 110, and sent to computing device 110. In one embodiment update results display page 400 is in a HyperText Markup Language (HTML) or an eXtensible HTML (XHTML) format that is sent using Hypertext Transport Protocol (HTTP) and viewable via a web browser application.

As illustrated, update results display page 400 includes the system identifying information 405 of the system it is generated for. In addition, page 400 is divided into various sections 410-470 identifying the different types of information relevant to the identified system 405. For example page 400 may include hardware updates 410, software updates 420, drivers 430, known errata 440, recall information 450, partner-provided suggestions 460 such as updates and applications known to work well with the particular system, and knowledge base articles 470 relevant to the system.

Each section 410-470 includes a description of its individual listed items and a hyperlink (or other access information) for that individual item. As such, the end user of system is provided with a complete and exhaustive resource for updating and improving the specific system. The end user does not have to reference multiple different vendor websites to obtain the resources it needs to updates various hardware and software of the system, as well as identify known issues, problems, and fixes for that particular system.

Figure 5:
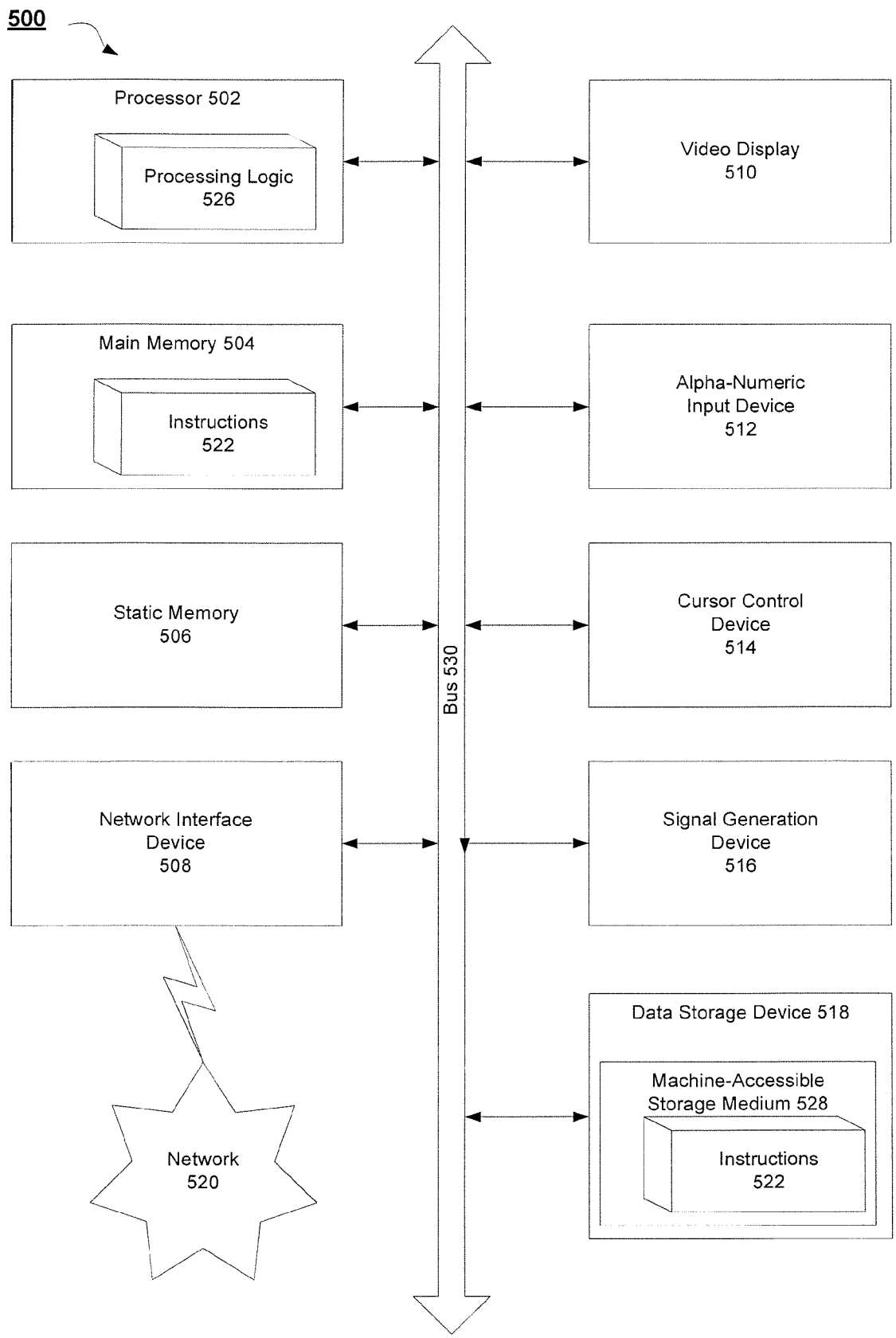
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform customized aggregation of system-specific information for Post-Installation Suggestions by system 100 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 200 and 300 for customized aggregation of system-specific information for Post-Installation Suggestions described with respect to FIGS. 2 and 3, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
receiving, by an update service computing device from an end user computing device, identifying information of components of the end user computing device, the components comprising hardware of the end user computer device and software of the end user computing device, wherein the identifying information comprises a list of at least a portion of the hardware of the end user computing device and a list of at least a portion of the software of the end user computing device;
referencing, by the update service computing device, a database with the received identifying information to determine a system of the end user computing device that comprises at least one of a make or a model of the end user computing device;
aggregating, by the update service computing device, updates, suggestions, and information specific to the determined system of the end user computing device into a result list, the updates, suggestions, and information received from a repository of historical system results and third-party vendors and associated with the determined system of the end user computing device; and
providing, by the update service computing device, the result list to the end user computing device.

2. The method of claim 1, wherein the identifying information comprises a list of hardware, installed software, and OS type and version.

3. The method of claim 2, wherein the referencing the database further comprises accessing the database with a combination of the hardware, the installed software, and the OS type and version in order to determine the system of the end user computing device.

4. The method of claim 1, wherein the end user computing device sends the at least one of the make or the model of the end user computing device to the update service computing device.

5. The method of claim 1, wherein the updates comprise one or more updates for the hardware of the components, one or more updates for the software of the components, and one or more updates for drivers of the components.

6. The method of claim 1, wherein the information received from the third-party vendors comprises known errata related to the components, known recalls related to the components, known fixes for the components, and knowledge base articles related to the components.

7. The method of claim 1, wherein the suggestions received from the third-party vendors comprise recommended applications to download that other users of a same type of the end user computing device have used.

8. The method of claim 1, wherein the customized result list is in a Hypertext Markup Language (HTML) format that is sent via Hypertext Transport Protocol (HTTP).

9. A system, comprising:
a processing device;
a memory communicably coupled to the processing device;
system analysis logic executable from the memory by the processing device, the system analysis logic to receive, from an end user computing device, identifying information of components of the end user computing device, the components comprising hardware of the computer system and software of the end user computing device, wherein the identifying information comprises a list of at least a portion of the hardware of the end user computing device and a list of at least a portion of the software of the end user computing device; and
result generation logic executable from the memory by the processing device and communicably coupled to the system analysis logic, the result generation logic to:
reference a database with the received identifying information to determine a system of the end user computing device, wherein the system comprises at least one of a make or a model of the end user computing device;
aggregate updates, suggestions, and information specific to the determined system of the end user computing device into a result list, the updates, suggestions, and information received from a repository of historical system results and third-party vendors and associated with the determined system of the end user computing device; and
provide the result list to the end user computing device.

10. The system of claim 9, wherein the identifying information comprises a list of hardware, installed software, and OS type and version.

11. The system of claim 10, wherein the system analysis logic to reference the database further comprises the system analysis logic to access the database with a combination of the hardware, the installed software, and the OS type and version in order to determine the system of the end user computing device.

12. The system of claim 9, wherein the end user computing device sends the at least one of the make or the model of the end user computing device to the system analysis logic.

13. The system of claim 9, wherein the plurality of updates comprises one or more updates for the hardware of the computer system, one or more updates for the software of the end user computing device, and one or more updates for drivers of the end user computing device.

14. The system of claim 9, wherein the information received from the plurality of third-party vendors comprises known errata related to the end user computing device, known recalls related to the computer system, known fixes for the system, and knowledge base articles related to the end user computing device.

15. The system of claim 9, wherein the suggestions received from the plurality of third-party vendors comprise recommended applications to download that other users of a same type of the end user computing device have used.

16. A non-transitory machine-readable storage medium including data that, when accessed by a computing device, cause the computing device to perform operations comprising:
receiving, by an update service computing device from an end user computing device, identifying information of components of the end user computing device, the components comprising hardware of the end user computer device and software of the end user computing device, wherein the identifying information comprises a list of at least a portion of the hardware of the end user computing device and a list of at least a portion of the software of the end user computing device;
referencing, by the update service computing device, a database with the received identifying information to determine a system of the end user computing device, wherein the system comprises at least one of a make or a model of the end user computing device;
aggregating, by the update service computing device, updates, suggestions, and information specific to the determined system of the end user computing device into a result list, the updates, suggestions, and information received from a repository of historical system results and third-party vendors and associated with the determined system of the end user computing device; and
providing, by the update service computing device, the result list to the end user computing device.

17. The non-transitory machine-readable storage medium of claim 16, wherein the identifying information comprises a list of hardware, installed software, and OS type and version.

18. The non-transitory machine-readable storage medium of claim 17, wherein the referencing the database further comprises accessing the database with a combination of the hardware, the installed software, and the OS type and version in order to determine the system of the end user computing device.

19. The non-transitory machine-readable storage medium of claim 16, wherein the end user computing device sends the at least one of the make or the model of the end user computing device to the update service computing device.

20. The non-transitory machine-readable storage medium of claim 16, wherein the information received from the plurality of third-party vendors comprises known errata related to the components, known recalls related to the components, known fixes for the components, and knowledge base articles related to the components.

* * * * *